Patented May 19, 1931

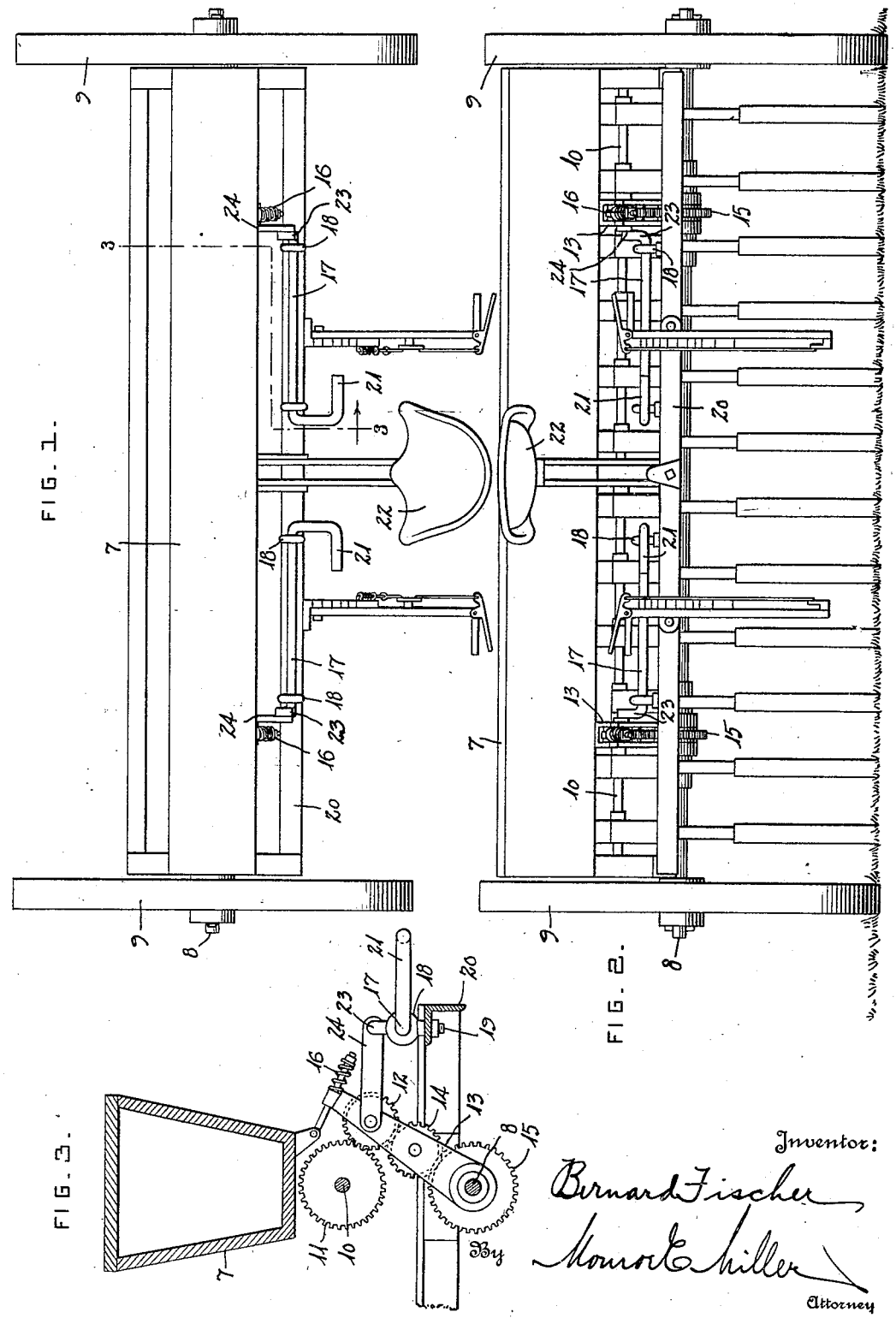

1,806,050

UNITED STATES PATENT OFFICE

BERNARD FISCHER, OF ST. CHARLES, MISSOURI

FOOT CONTROL FOR SEED PLANTERS

Application filed August 13, 1928. Serial No. 299,202.

The present invention relates to seed planting machines, and aims to provide a novel and improved attachment for a drilling machine, to enable the operator to conveniently bring the seed droppers into and out of operation.

The invention also has for an object the provision of such an attachment which may be readily applied to a drilling machine already in use, and which will be practical and efficient in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a plan view of a grain drilling machine embodying the improvements.

Fig. 2 is a rear view thereof.

Fig. 3 is a section on the line 3—3 of Fig. 1.

The grain drilling machine may be of any conventional kind. As shown, it comprises a seed hopper or bin 7 mounted on an axle 8 having the wheels 9. The seed droppers are operated by right and left hand shafts 10. Each shaft 10 has a gear wheel 11 adapted to mesh with a gear wheel 12 carried by an arm 13 mounted for oscillation on the axle 8, and the gear wheel 12 meshes with another gear wheel 14 carried by said arm, which gear wheel 14 in turn meshes with a gear wheel 15 secured on the axle 8. Suitable spring means 16 are provided to swing the arms 13 so as to hold the gear wheels 12 in mesh with the gear wheels 11, thereby driving the seed dropper shafts 10 from the axle 8 which rotates with the wheels 9.

In carrying out the invention, a pair of the attachments are employed, one for each shaft 10, so that the right hand and the left hand seed droppers may be independently controlled.

The right and left hand attachments comprise the rock shafts 17 journaled for rotation in the eyes 18 of bolts 19 secured through a rear transverse angle iron rail or member 20 of the frame of the machine on which the hopper 7 is mounted. The inner terminals of the shafts 17 are bent back in hook formation to provide the foot pedals 21 within convenient reach from the operator's seat 22, in order that said pedals may be readily depressed by the feet.

At their opposite ends the shafts 17 have upstanding arms 23 which are connected by links 24 with the arms 13, so that when the pedals 21 are depressed the arms 13 are swung rearwardly against the spring means 16, thereby removing the pinions or gear wheels 12 from the gear wheels 11, and opening the connections between the axle 8 and seed dropper shafts 10, so that the seed droppers are stopped.

It is thus possible for the operator to conveniently disconnect the seed droppers from the driving shaft or axle 8, without lifting the drills from the ground, and the right and left hand seed droppers may be controlled independently. The dropping of seed may thus be interrupted when turning the machine around or when passing around stumps, corn shocks, and the like.

Having thus described the invention, what is claimed as new is:—

A drilling machine comprising a frame, a wheel-mounted axle supporting said frame, a bin mounted on the frame, right and left seed dropper shafts below the bin, two arms mounted for oscillation on said axle, gear wheels on said shafts, gear wheels on said arms geared to the axle and movable into and out of mesh with the firstnamed gear wheels, an operator's seat mounted on the frame behind the bin, right and left hand rock shafts journaled on the frame and having adjacent end portions bent back into hook formation to provide foot pedals, said pedals being arranged in front of the seat to be conveniently depressed by the feet of the operator, said rock shafts having arms, links connecting the firstnamed and secondnamed arms whereby the depression of said foot pedals will swing the firstnamed arms away from the firstnamed gear wheels, and spring means for yieldingly swinging the firstnamed arms toward the firstnamed gear wheels.

In testimony whereof I hereunto affix my signature.

BERNARD FISCHER.